US009122487B2

(12) United States Patent
Golla et al.

(10) Patent No.: US 9,122,487 B2
(45) Date of Patent: Sep. 1, 2015

(54) SYSTEM AND METHOD FOR BALANCING INSTRUCTION LOADS BETWEEN MULTIPLE EXECUTION UNITS USING ASSIGNMENT HISTORY

(75) Inventors: Robert T. Golla, Round Rock, TX (US); Gregory F. Grohoski, Bee Cave, TX (US)

(73) Assignee: Oracle America, Inc., Redwood City, CA (US)

( * ) Notice: Subject to any disclaimer, the term of this patent is extended or adjusted under 35 U.S.C. 154(b) by 1670 days.

(21) Appl. No.: 12/490,005

(22) Filed: Jun. 23, 2009

(65) Prior Publication Data

US 2010/0325394 A1   Dec. 23, 2010

(51) Int. Cl.
*G06F 9/38* (2006.01)

(52) U.S. Cl.
CPC ............ *G06F 9/3885* (2013.01); *G06F 9/3824* (2013.01); *G06F 9/3836* (2013.01); *G06F 9/3851* (2013.01); *G06F 9/3861* (2013.01)

(58) Field of Classification Search
None
See application file for complete search history.

(56) References Cited

U.S. PATENT DOCUMENTS

| 5,133,077 | A | 7/1992 | Karne et al. |
|---|---|---|---|
| 5,465,373 | A | 11/1995 | Kahle et al. |
| 5,613,080 | A | 3/1997 | Ray et al. |
| 5,721,855 | A * | 2/1998 | Hinton et al. ................. 712/218 |
| 6,219,780 | B1 | 4/2001 | Lipasti |
| 6,944,750 | B1 * | 9/2005 | Sheaffer ........................ 712/215 |
| 2002/0087833 | A1 * | 7/2002 | Burns et al. .................. 712/215 |
| 2003/0135724 | A1 * | 7/2003 | Krishnamurthy et al. ..... 712/245 |
| 2004/0153629 | A1 * | 8/2004 | Asakawa ...................... 712/207 |
| 2010/0031006 | A1 * | 2/2010 | El-essawy et al. ............ 712/206 |

OTHER PUBLICATIONS

Cotofana, S.; Juurlink, B.; Vassiliadis, S. "Counter based superscalar instruction issuing" In Proceedings of the 26th Euromicro Conference. 307-15 vol. 1;2 vol. xv+467+475. Los Alamitos, CA, USA:IEEE Comput. Soc, 2000.*

* cited by examiner

*Primary Examiner* — Jacob A Petranek
(74) *Attorney, Agent, or Firm* — Robert C. Kowert; Meyertons, Hood, Kivlin, Kowert & Goetzel, P.C.

(57) ABSTRACT

A system and method for balancing instruction loads between multiple execution units are disclosed. One or more execution units may be represented by a slot configured to accept instructions on behalf of the execution unit(s). A decode unit may assign instructions to a particular slot for subsequent scheduling for execution. Slot assignments may be made based on an instruction's type and/or on a history of previous slot assignments. A cumulative slot assignment history may be maintained in a bias counter, the value of which reflects the bias of previous slot assignments. Slot assignments may be determined based on the value of the bias counter, in order to balance the instruction load across all slots, and all execution units. The bias counter may reflect slot assignments made only within a desired historical window. A separate data structure may store data reflecting the actual slot assignments made during the desired historical window.

17 Claims, 7 Drawing Sheets

|         | Slot Assignment |               |
| Counter | Instruction 0 | Instruction 1 |
| </= -3  | 0 | 0 |
| -2, -1, 0, 1, 2 | 0 | 1 |
| >/= 3   | 1 | 1 |

FIG. 5A

|         | Slot Assignment |               |
| Counter | Instruction 0 | Instruction 1 |
| </= -3  | 0 | 0 |
| -2, -1, 0, 1, 2 | 0 | 1 |
| >/= 3   | 0 | 1 |

FIG. 5B

|         | Slot Assignment |               |
| Counter | Instruction 0 | Instruction 1 |
| </= -3  | 1 | 0 |
| -2, -1, 0, 1, 2 | 1 | 0 |
| >/= 3   | 1 | 1 |

FIG. 5C

SYSTEM AND METHOD FOR BALANCING INSTRUCTION LOADS BETWEEN MULTIPLE EXECUTION UNITS USING ASSIGNMENT HISTORY

BACKGROUND OF THE INVENTION

1. Field of the Invention

This invention relates to multi-threaded processors and, more specifically, to balancing instruction loads between multiple execution units within a multi-threaded processor.

2. Description of the Related Art

Modern computer processors typically include cores with multiple instruction execution units. Processor performance may be improved when multiple execution units process instructions in parallel. Some execution units are configured to process specific instruction types. For example, some execution units are configured to process integer-type instructions while other execution units are configured to process load/store instructions and still others are configured to process floating point or graphics instructions.

If the instruction load is not equally balanced between such execution units, processor performance may be slowed by instructions waiting for a particular execution unit to become available while other execution units sit idle or under-loaded.

SUMMARY

Various embodiments of a system and method for balancing instruction loads between multiple execution units in a multi-threaded processor are disclosed. In some embodiments, instructions may be assigned to particular execution units at the decode stage. For example, a decode unit may determine whether assignment of an instruction is restricted to a particular execution unit based on the instruction's type. If the instruction can be executed on any of multiple execution units, the decode unit may consider the history of prior instruction assignments when determining an appropriate assignment for the instruction. In some embodiments, this method may equally balance the load of instruction assignments between the multiple execution units.

In some embodiments, one or more execution units may be represented by a slot configured to accept instructions on behalf of the execution unit(s). For example, a particular slot may represent an integer execution unit and a load/store execution unit, while another slot may represent another integer execution unit and a floating point/graphics execution unit. Instructions may be assigned to slots at the decode stage. In some embodiments, instruction assignments may be balanced across multiple slots in an effort to equally balance the instruction load between multiple execution units. In some embodiments, balancing instruction assignments across multiple slots may include maintaining a history of previous slot assignments. For example, a cumulative slot assignment history may, in some embodiments, be maintained in a bias counter, the value of which reflects the bias of the most recent slot assignments. During decode, the decode unit may assign instructions to specific slots depending on the value of the bias counter. For example, if the bias counter indicates that instructions have been assigned more often to one particular slot than to a second slot in the recent past, the decode unit may be configured to, at least temporarily, bias selection toward the second slot in order to more equally balance the instruction load across all slots and, thus, more equally balance the instruction load between multiple execution units.

In some embodiments, the system may be configured to assign instructions to slots and/or execution units dependent on previous assignments made during a specific historical timeframe, e.g., dependent on a predetermined number of prior slot assignments. In some embodiments, data reflecting the actual slot assignments made within the desired historical timeframe may be stored within a separate data structure. For example, a FIFO may store the slot assignments made within a desired historical period. In some embodiments, the bias counter may be configured to reflect assignments made only within the desired historical window. For example, for each new instruction assignment, the counter may be adjusted to reflect the new instruction assignment and to remove the effect of the oldest instruction assignment within the desired historical window. In some embodiments, the slot assignments stored in the FIFO may be used to make these adjustments to the counter.

BRIEF DESCRIPTION OF THE DRAWINGS

FIGS. 5A-C illustrate slot assignments that may be made for instructions in a decode group dependent on the value of a counter, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Overview of Multithreaded Processor Architecture

Figure 1:
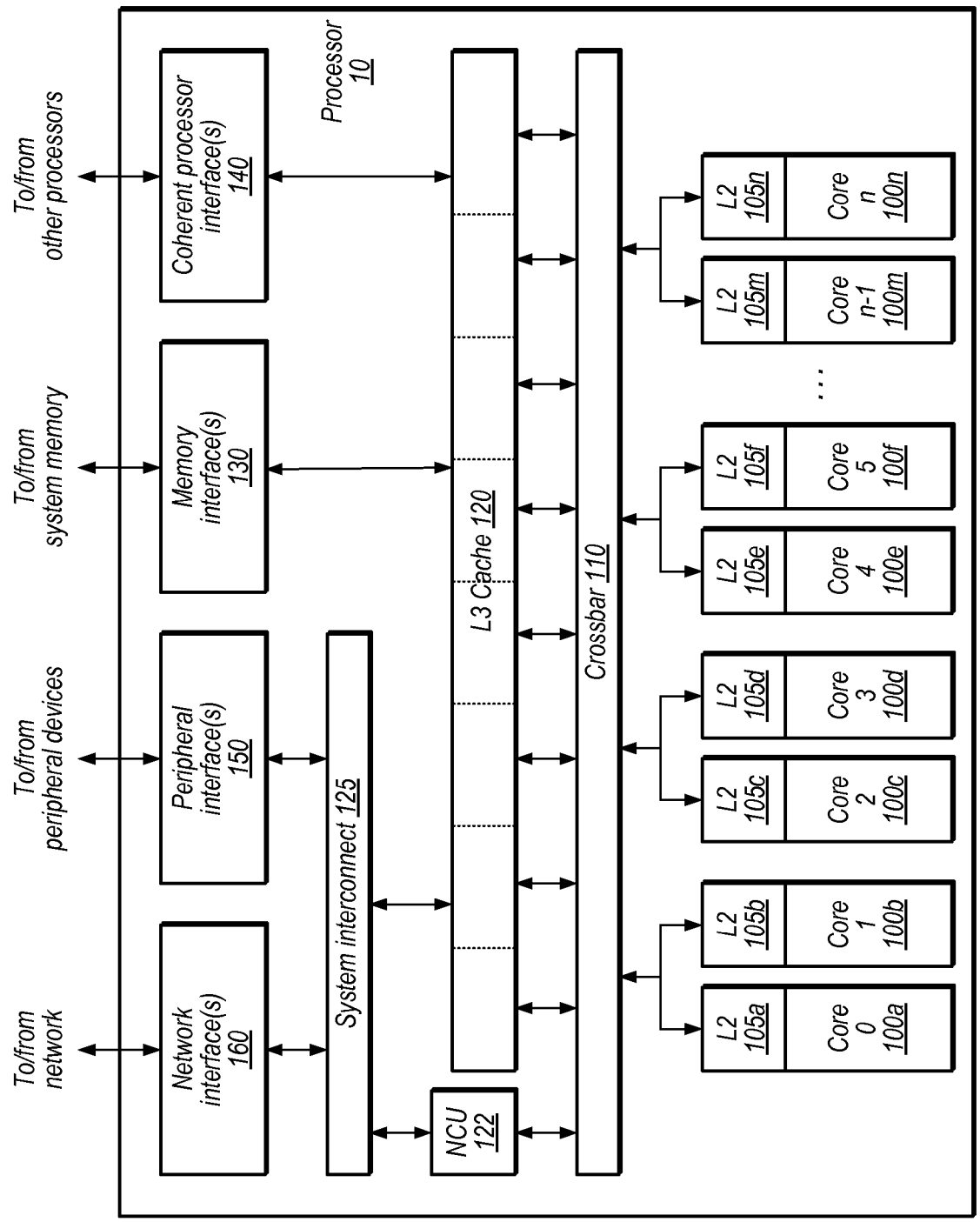
FIG. 1 is a block diagram illustrating one embodiment of a multithreaded processor.

A block diagram illustrating one embodiment of a multi-threaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In some embodiments, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In some embodiments, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in some embodiments, each core 100 may have a dedicated corresponding L2 cache 105. In some embodiments, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In some embodiments, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In some embodiments, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In some embodiments, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in some embodiments, crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in some embodiments, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments, L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In some embodiments, peripheral interface 150 may implement one or more instances of a standard peripheral interface. For example, some embodiments of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments, peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In some embodiments, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in some embodiments, each of cores 100 may be configured for multithreaded, out-of-order execution. More specifically, in some embodiments, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In some embodiments, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In some embodiments, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
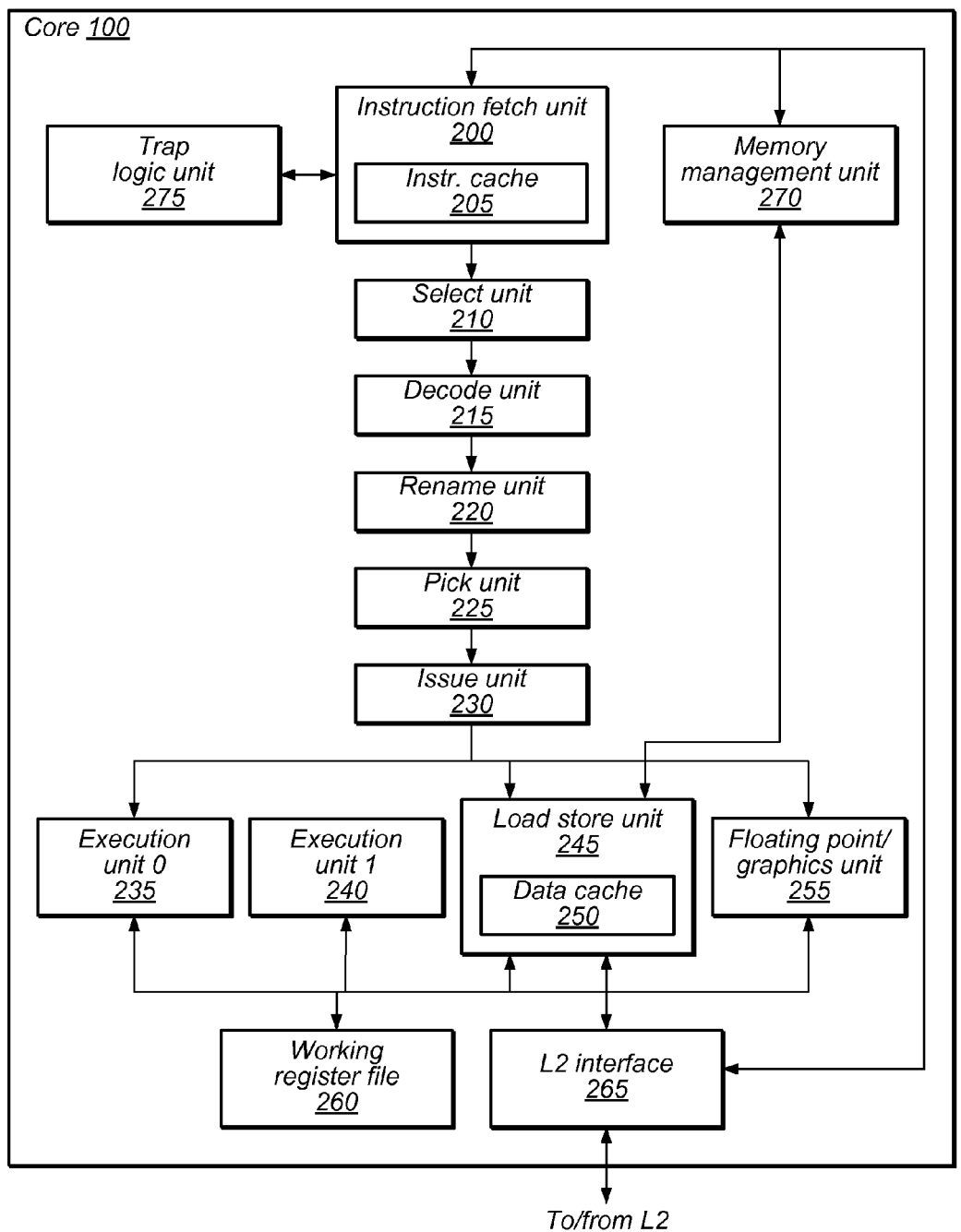
FIG. 2 is a block diagram illustrating one embodiment of a processor core configured to perform fine-grained multi-threading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270.

In the following discussion, example embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In some embodiments, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In some embodiments, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in some embodiments, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In some embodiments, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In some embodiments, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In some embodiments, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In some embodiments, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In some embodiments, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In some embodiments, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In some embodiments, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer-type instructions issued from slot 0, and may also perform address calculations for load/store instructions executed by LSU 245. EXU1 240 may be configured to execute integer-type instructions issued from slot 1, as well as branch instructions. In some embodiments, FGU instructions and multi-cycle integer-type instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments, execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In some embodiments, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In some embodiments, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in some embodiments, FGU 255 may implement single- and double-precision floating-point arithmetic instructions compliant with the IEEE 754-1985 floating-point standard, such as add, subtract, multiply, divide, and certain transcendental functions. Also, in some embodiments, FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in some embodiments, FGU 255 may implement certain integer-type instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In some embodiments, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in some embodiments, floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In some embodiments, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In some embodiments, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In some embodiments, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In some embodiments, MMU 270 may be configured to manage one or more translation tables stored in system memory and to traverse such tables (which, in some embodiments, may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments, multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In some embodiments, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In some embodiments, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In some embodiments, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In some embodiments, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Balancing Assignments Between Execution Units

A multi-threaded processor may include cores with multiple instruction execution units. As previously described, FIG. 2 illustrates one embodiment of a core with multiple instruction execution units, where core 100 of multi-threaded processor 10 may include execution unit 0 (EXU0) 235, execution unit 1 (EXU1) 240, load store unit (LSU) 245, and floating point/graphics unit (FGU) 255. Balancing the instruction load between the multiple execution units, such that all execution units are loaded as evenly as possible, may result in higher processor performance. For example, when the instruction load is equally balanced, processor performance may not be slowed by instructions waiting for a particular execution unit to become available while one or more other execution units sit idle or under-loaded.

In some embodiments, execution units within a processor core may be configured to process specific instruction types. Balancing the instruction load between these execution units may include determining instruction assignments based on the configuration of the execution units. For example, as described above, LSU 245 may be configured to execute load/store instructions and FGU 255 may be configured to execute floating point/graphics instructions. In this example, all load/store instructions may be assigned to LSU 245 for execution, and all floating point/graphics instructions may be assigned to FGU 255 for execution. In some embodiments, multiple execution units may be similarly, or identically, configured to execute the same type(s) of instructions. For example, as described above, EXU0 235 and EXU1 240 may both be configured to execute integer-type instructions including arithmetic, logical, and/or shift instructions. In this example, integer-type instructions may be assigned to either EXU0 235 or EXU1 240. In some embodiments, processor performance may be improved by balancing the assignment of integer-type instructions between EXU0 235 and EXU1 240 as evenly as possible. In other embodiments, there may be other types of execution units and/or the execution units may be configured in a different manner. For example, three execution units may be configured to execute integer-type instructions, or two execution units may be configured to execute floating point/graphics instructions. In another example, a processor may include one or more execution units configured for execution of a subset of instructions other than those described above (e.g., a subset of standard or custom graphics instructions, complex mathematical instructions, or other specialty instructions). In some embodiments, instruction assignments may be thread agnostic, i.e., an instruction assignment may be made irrespective of the thread in which the instruction is executing. Thus, in some embodiments, balancing of instruction assignments between execution units may be performed across multiple threads operating within a core, rather than balanced within a single thread.

Figure 3:
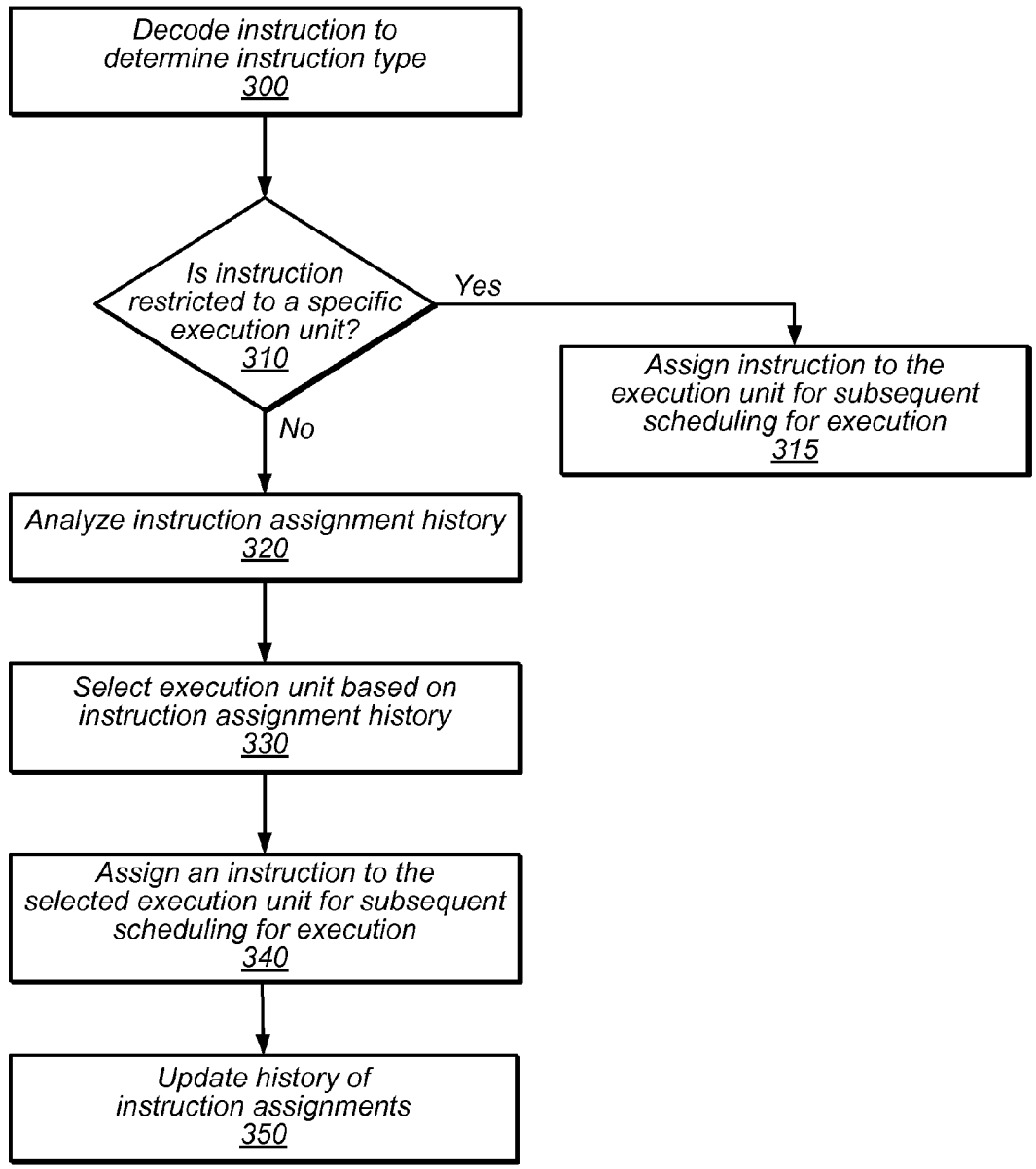
FIG. 3 is a flowchart illustrating a method for balancing instruction assignments between multiple execution units, according to various embodiments.

The system described herein may, in some embodiments, be configured to balance instruction loading between multiple execution units based, at least in part, on a history of recent assignments. FIG. 3 is a flowchart illustrating a method for balancing instruction assignments between multiple execution units, according to various embodiments. In this example, the method may include decoding an instruction to determine the instruction type, as in 300. For example, in some embodiments, decode unit 215 may be configured to decode and determine an instruction type for one instruction at a time. In other embodiments, decode unit 215 may be configured to decode and determine a respective instruction type for more than one instruction at a time. As illustrated in FIG. 3, the method may include determining, based on the instruction type, whether the assignment of the instruction is restricted to a specific execution unit, as in 310. For example, the assignment of a load/store instruction may be restricted to execution unit LSU 245, since LSU 245 is the only execution unit configured to execute load/store instructions, as described above. In some embodiments, if an instruction assignment is restricted to a particular execution unit, shown as the positive exit of 310, the instruction may be assigned to that execution unit, as in 315. For example, decode unit 215 may be configured to assign all load/store instructions to LSU 245, and to assign all floating point instructions to FGU 255.

In some embodiments, various instructions may be executable on any one of several execution units. Thus, assignment of such an instruction may not be restricted to a particular execution unit, shown as the negative exit of 310. In this case, as illustrated in FIG. 3, the method may include analyzing the history of prior instruction assignments to the multiple execution units, as shown in 320, and selecting an execution unit based, at least in part, on this history, as in 330. For example, decode unit 215 may be configured to determine an appropriate execution assignment for an instruction executable on any one of several execution units such that the instruction load remains evenly balanced between the execution units. As illustrated in FIG. 3, the method may include assigning an instruction to a selected execution unit for subsequent scheduling for execution, as shown in 340. For example, as described above, decode unit 215 may be configured to assign an integer-type instruction (e.g., an arithmetic, logical, or shift instruction) to EXU0 235 or to EXU1 240, dependent on the history of assignments between the two execution units. As illustrated in FIG. 3, the method may include updating the instruction assignment history to reflect the current instruction assignment, as shown in 350. Various methods for updating the instruction assignment history are described in more detail below.

As previously noted, in some embodiments, one or more execution units may be represented by a slot, which may be configured to accept instructions on behalf of the execution unit(s). Instructions may be assigned to specific slots for subsequent scheduling for execution. For example, decode unit 215 may be configured to assign instructions to specific slots based on instruction type and/or on the prior history of instruction assignments to specific slots. In some embodiments, decode unit 215 may be configured to process a decode group of up to two instructions per execution cycle and may be configured to assign a slot to each instruction during the decode operation. An instruction's slot assignment may remain unchanged throughout the instruction processing pipeline illustrated in FIG. 2. For example, an instruction may receive a slot assignment from decode unit 215 and may retain the slot assignment while being processed through rename unit 220, pick unit 225, and issue unit 230. In some embodiments, issue unit 230 may be configured to issue an instruction to a particular slot based on the instruction's slot assignment.

Figure 4:
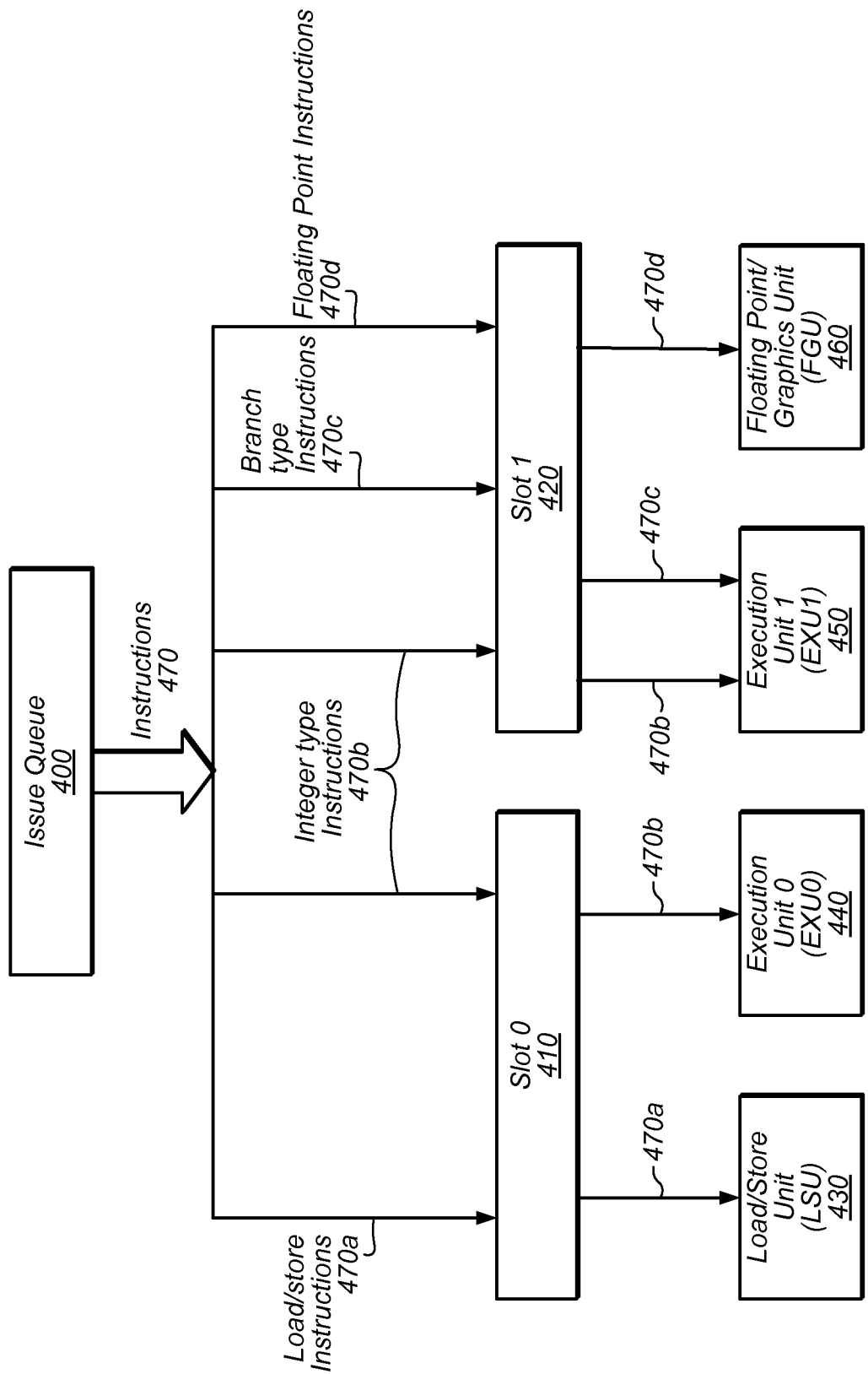
FIG. 4 illustrates the flow of instructions from an issue queue to multiple execution units, according to some embodiments.

As described above, in some embodiments, one or more execution units may be configured to execute instructions issued to a particular slot. FIG. 4 illustrates the flow of instructions from issue queue 400 to multiple execution units via slots representing the execution units, according to some embodiments. In some embodiments, issue queue 400 may be implemented within issue unit 230. In the example illustrated in FIG. 4, issue queue 400 may contain instructions that have been assigned to specific slots by decode unit 215. In some embodiments, issue unit 230 may be configured to issue instructions 470 from issue queue 400 to particular slots dependent on the slot assignment of each instruction. As described above, an instruction's slot assignment may depend on the instruction's type. For example, as illustrated in FIG. 4, issue unit 230 may be configured to issue all load/store instructions 470*a* to slot 0 410 for execution by LSU 430. In another example, issue unit 230 may be configured to issue all floating point/graphics instructions 470*d* to slot 1 420 for execution by FGU 450. In still another example, issue unit 230 may be configured to issue all branch type instructions 470*c* to slot 1 420 for execution by EXU1 450. In some embodiments, instructions assigned to a given slot may be routed to a particular execution unit based on the instruction's type. For example, all load/store instructions 470*a* issued to slot 0 410 may be routed to LSU 430 for execution. As described above, EXU0 440 and EXU1 450 may both be configured to execute integer-type instructions. Therefore, integer-type instructions 470b may be assigned to either slot 0 410 or slot 1 420. In some embodiments, issue unit 230 may be configured to issue integer-type instructions 470b to slot 0 410 or slot 1 420 based on each instruction's slot assignment.

In other embodiments, other quantities of slots and/or types of slot assignments may be employed, or slots may be omitted entirely. For example, instructions may be assigned directly to an execution unit (e.g., by decode unit 215 at decode). In still other embodiments, execution units 430-460 may not be bound to specific issue slots, or may be differently bound than described herein. In various embodiments, slots may be symmetric or asymmetric, i.e., multiple slots may represent the same types of execution units or different types of execution units. For example, a slot may represent more than one execution unit for integer-type instructions. In this case, a slot assignment value may include additional information indicating an assignment to a particular execution unit within the slot. In another example, two slots may each represent an execution unit configured to execute load/store instructions and an execution unit configured to execute integer-type instructions, while a third slot may represent one or more other types of execution units.

As previously described, balancing the instruction load between execution units, i.e., between slots, may result in improved processor performance. For example, as illustrated in FIG. 4, integer-type instructions may be assigned to either slot 0 410 or slot 1 420. In this case, equally balancing the slot assignments of integer-type instructions between slot 0 410 and slot 1 420 may keep both EXU0 and EXU1 full, resulting in efficient use of execution resources and improved processor performance. In some embodiments, balancing the instruction load between slot 0 410 and slot 1 420 may include maintaining a history of previous slot assignments. For example, a cumulative slot assignment history may, in some embodiments, be reflected in a bias counter. In some embodiments, the counter may be implemented as a hardware counter. In other embodiments, a software data structure stored in shared memory may be configured to maintain the cumulative slot assignment history as a bias counter. In some embodiments, the counter may be configured to store a signed value that may reflect the bias of the slot assignment history. In some such embodiments, each time an instruction is decoded and assigned to a slot, the counter may be updated to reflect the slot assignment made by the decode unit. As a result, the sign of the counter value may indicate whether the slot assignment history (to that point) has been more heavily biased toward one slot or another. For example, the counter may be incremented when an instruction is assigned to slot 0 and the counter may be decremented when an instruction is assigned to slot 1. In this case, a negative value in the counter may indicate a slot assignment history more heavily biased toward slot 1 assignments and a positive value in the counter may indicate a slot history more heavily biased toward slot 0 assignments. In other embodiments, counter values may reflect other encodings or data indicating a historical bias in instruction assignments to a particular slot, and/or the system may employ other methods for updating a bias counter to reflect historical slot assignments.

As noted above, in some embodiments, decode unit 215 may be configured to determine slot assignments for instructions based on the value of the bias counter. In some embodiments, decode unit 215 may be configured to process a decode group of up to two instructions per execution cycle. FIGS. 5A-5C illustrate, for some embodiments, the slot assignments that may be made for each of the two instructions (instruction 0 and instruction 1) in a decode group, dependent on various values of the bias counter. FIG. 5A illustrates an example in which each instruction in the decode group may be assigned to any slot, i.e. both of the instructions are executable on execution units represented by either slot. In this example, if the value of the counter is less than or equal to negative three, this indicates that the historical slot assignments reflected by the counter have been biased toward slot 1. In this case, both instructions may be assigned to slot 0. If the counter value is equal to negative two, negative one, zero, positive one, or positive two, this indicates that the historical slot assignments reflected by the counter have not been biased toward a particular slot. Therefore, the instruction assignments may be equally split between slot 0 and slot 1, with either instruction being assigned to each of the slots. If the counter value is greater than or equal to three, this indicates that the historical slot assignments reflected by the counter have been biased toward slot 0. Therefore, both instructions may be assigned to slot 1. In some embodiments, the approach illustrated in FIG. 5A may serve to attempt to keep the instruction load balanced between slot 0 and slot 1, for instructions that are executable on execution units of either slot. In other embodiments, the threshold values used to determine slot assignments may be different than negative three and positive three. For example, negative two and positive two may be used, or the bias counter may be configured to indicate only whether the bias is positive or negative, without a specific numerical value.

FIG. 5B illustrates an example of slot assignments that may be made for each of the two instructions in a decode group when the first instruction (instruction 0) is executable only on an execution unit of slot 0. In this example, if the value of the counter is less than or equal to negative three, this indicates that the historical slot assignments reflected by the counter have been biased toward slot 1. In this case, both instructions may be assigned to slot 0. If the counter value is equal to negative two, negative one, zero, positive one, or positive two, this indicates that the historical slot assignments reflected by the counter have not been biased toward a particular slot. Therefore, the instruction assignments may be equally split between slot 0 and slot 1, with instruction 0 being assigned to slot 0 and instruction 1 being assigned to slot 1. If the counter value is greater than or equal to three, this indicates that the historical slot assignments reflected by the counter have been biased toward slot 0. In this case, the instruction assignments may again be equally split between slot 0 and slot 1, since instruction 0 must still be assigned to slot 0. In such embodiments, the approach illustrated in FIG. 5B may serve to attempt to keep the instruction load balanced between slot 0 and slot 1, for a pair of instructions in which the first instruction is executable only on an execution unit of slot 0.

FIG. 5C illustrates an example of slot assignments that may be made for each of the two instructions in a decode group when the first instruction (instruction 0) is executable only on an execution unit of slot 1. In this example, if the value of the counter is less than or equal to negative three, this indicates that the historical slot assignments reflected by the counter have been biased toward slot 1. In this case, the instruction assignments may be equally split between slot 0 and slot 1, since instruction 0 must be assigned to slot 1. If the counter value is equal to negative two, negative one, zero, positive one, or positive two, this indicates that the historical slot assignments reflected by the counter have not been biased toward a particular slot. Therefore, the instruction assignments may be equally split between slot 0 and slot 1, with instruction 0 being assigned to slot 1, as required, and instruction 1 being assigned to slot 0. If the counter value is greater than or equal to three, this indicates that the historical slot assignments reflected by the counter have been biased toward slot 0. In this case, both instructions may be assigned to slot 1. In such embodiments, the approach illustrated in FIG. 5C may serve to attempt to keep the instruction load balanced between slot 0 and slot 1, for a pair of instructions in which the first instruction is executable only on an execution unit of slot 1.

Table 1 below is a truth table illustrating slot assignments that may be made by decode unit 215 for up to two instructions in a decode group, based on values of the bias counter between negative three and positive three, according to some embodiments. In this example, the "Counter" column of Table 1 indicates bias counter values. Bias counter values resulting in identical slot assignments are grouped together in Table 1 as follows: less than or equal to negative three; negative 1 or negative 2; zero; positive 1 or positive 2; and greater than or equal to positive three. The "Instr. valid" columns indicate whether a particular instruction within a decode group is valid. The "I_0" column represents instruction 0, i.e. the first instruction in the decode group, and the "I_1" column represents instruction 1, i.e., the second instruction in the decode group. A value of zero in these columns indicates that the corresponding instruction is not valid and a value of one indicates that the corresponding instruction is valid. The "I_0 slot req." and "I_1 slot req." columns indicate whether instructions 0 and 1, respectively, are restricted to assignment to a particular slot, as described above. For each instruction, a value of one in the "0", "1", or "Any" column indicates that the instruction is restricted to slot 0 or slot 1, or can be assigned to any slot, respectively. The "I_0 slot" and "I_1 slot" columns represent the actual slot assignments made for instructions 0 and 1, respectively, based on the value of the bias counter and any slot assignment restrictions. A value of one in the "0" column indicates that an instruction is assigned to slot 0 and a value of one in the "1" column indicates that an instruction is assigned to slot 1. An entry of Table 1 marked with a "–" indicates that the value of the entry is not required to determine the particular slot assignments for the specific values in the corresponding row of the table.

In this example, row 1 of Table 1 illustrates an illegal scenario in which instruction 0 is invalid and instruction 1 is valid. A decode group, in some embodiments, may be configured such that if the first instruction in the decode group is invalid, the decode group is invalid. Therefore, the case illustrated in row 1, in which the first instruction is invalid and the second instruction is valid, is illegal, and no slot assignment is made. In rows 2 and 3 of Table 1, instruction 0 is the only valid instruction in the decode group and is restricted to slot 0 or 1, respectively. In this example, the value of the bias counter does not matter, as instruction 0 is assigned to a slot according to the slot restriction. Rows 4-8 illustrate a scenario in which instruction 0 is the only valid instruction in the decode group and is not restricted to any particular slot assignment. In this case, instruction 0 is assigned to slot 0 for bias counter values of zero, negative one, negative two, negative three, or less than negative three, and instruction 0 is assigned to slot 1 for bias counter values of one, two, three or greater than three. Rows 9-12 illustrate that if instruction 0 is restricted to a particular slot, and both instructions are valid, instruction 0 must be assigned to that slot, regardless of any other inputs; and that if instruction 1 is restricted to a particular slot, and both instructions are valid, instruction 1 must be assigned to that slot, regardless of any other inputs. These rows may also indicate the slot assignments that are made when there is only one instruction to be processed in a particular decode group (and it is valid), in some embodiments. Rows 13-37 illustrate slot assignments made for each instruction within a decode group when both instructions are valid, based on bias counter values and slot assignment restrictions for each instruction. These scenarios illustrate a method to maintain, as much as possible, a neutral bias within the bias counter. For example, in row 30, the bias counter value is zero, instruction 0 is restricted to slot 0, and instruction 1 is not restricted to any slot. In this case, instruction 0 is assigned to slot 0, per the slot restriction, and instruction 1 is assigned to slot 1 to maintain a neutral bias within the bias counter.

TABLE 1

Instruction Slot Assignments Based on Bias Counter Values

| Row | Counter | Instr. valid | | I_0 slot req. | | | I_1 slot req. | | | I_0 slot | | I_1 slot | |
|---|---|---|---|---|---|---|---|---|---|---|---|---|---|
| | | I_0 | I_1 | 0 | 1 | Any | 0 | 1 | Any | 0 | 1 | 0 | 1 |
| 1 | — | 0 | 1 | — | — | — | — | — | — | — | — | — | — |
| 2 | — | 1 | 0 | 1 | 0 | 0 | — | — | — | 1 | 0 | — | — |
| 3 | — | 1 | 0 | 0 | 1 | 0 | — | — | — | 0 | 1 | — | — |
| 4 | </=−3 | 1 | 0 | 0 | 0 | 1 | — | — | — | 1 | 0 | — | — |
| 5 | −1, −2 | 1 | 0 | 0 | 0 | 1 | — | — | — | 1 | 0 | — | — |
| 6 | 0 | 1 | 0 | 0 | 0 | 1 | — | — | — | 1 | 0 | — | — |
| 7 | 1, 2 | 1 | 0 | 0 | 0 | 1 | — | — | — | 0 | 1 | — | — |
| 8 | >/=3 | 1 | 0 | 0 | 0 | 1 | — | — | — | 0 | 1 | — | — |
| 9 | — | 1 | 1 | 1 | 0 | 0 | — | — | — | 1 | 0 | — | — |
| 10 | — | 1 | 1 | 0 | 1 | 0 | — | — | — | 0 | 1 | — | — |
| 11 | — | 1 | 1 | — | — | — | 1 | 0 | 0 | — | — | 1 | 0 |
| 12 | — | 1 | 1 | — | — | — | 0 | 1 | 0 | — | — | 0 | 1 |
| 13 | </=−3 | 1 | 1 | 0 | 0 | 1 | 1 | 0 | 0 | 1 | 0 | 1 | 0 |
| 14 | −1, −2 | 1 | 1 | 0 | 0 | 1 | 1 | 0 | 0 | 0 | 1 | 1 | 0 |
| 15 | 0 | 1 | 1 | 0 | 0 | 1 | 1 | 0 | 0 | 0 | 1 | 1 | 0 |
| 16 | 1, 2 | 1 | 1 | 0 | 0 | 1 | 1 | 0 | 0 | 0 | 1 | 1 | 0 |
| 17 | >/=3 | 1 | 1 | 0 | 0 | 1 | 1 | 0 | 0 | 0 | 1 | 1 | 0 |
| 18 | </=−3 | 1 | 1 | 0 | 0 | 1 | 0 | 1 | 0 | 1 | 0 | 0 | 1 |
| 19 | −1, −2 | 1 | 1 | 0 | 0 | 1 | 0 | 1 | 0 | 1 | 0 | 0 | 1 |
| 20 | 0 | 1 | 1 | 0 | 0 | 1 | 0 | 1 | 0 | 1 | 0 | 0 | 1 |
| 21 | 1, 2 | 1 | 1 | 0 | 0 | 1 | 0 | 1 | 0 | 1 | 0 | 0 | 1 |
| 22 | >/=3 | 1 | 1 | 0 | 0 | 1 | 0 | 1 | 0 | 0 | 1 | 0 | 1 |
| 23 | </=−3 | 1 | 1 | 0 | 0 | 1 | 0 | 0 | 1 | 1 | 0 | 1 | 0 |

TABLE 1-continued

Instruction Slot Assignments Based on Bias Counter Values

| Row | Counter | Instr. valid I_0 | Instr. valid I_1 | I_0 slot req. 0 | I_0 slot req. 1 | I_0 slot req. Any | I_1 slot req. 0 | I_1 slot req. 1 | I_1 slot req. Any | I_0 slot 0 | I_0 slot 1 | I_1 slot 0 | I_1 slot 1 |
|---|---|---|---|---|---|---|---|---|---|---|---|---|---|
| 24 | −1, −2 | 1 | 1 | 0 | 0 | 1 | 0 | 0 | 1 | 1 | 0 | 0 | 1 |
| 25 | 0 | 1 | 1 | 0 | 0 | 1 | 0 | 0 | 1 | 1 | 0 | 0 | 1 |
| 26 | 1, 2 | 1 | 1 | 0 | 0 | 1 | 0 | 0 | 1 | 1 | 0 | 0 | 1 |
| 27 | >/=3 | 1 | 1 | 0 | 0 | 1 | 0 | 0 | 1 | 0 | 1 | 0 | 1 |
| 28 | </=−3 | 1 | 1 | 1 | 0 | 0 | 0 | 0 | 1 | 1 | 0 | 1 | 0 |
| 29 | −1, −2 | 1 | 1 | 1 | 0 | 0 | 0 | 0 | 1 | 1 | 0 | 0 | 1 |
| 30 | 0 | 1 | 1 | 1 | 0 | 0 | 0 | 0 | 1 | 1 | 0 | 0 | 1 |
| 31 | 1, 2 | 1 | 1 | 1 | 0 | 0 | 0 | 0 | 1 | 1 | 0 | 0 | 1 |
| 32 | >/=3 | 1 | 1 | 1 | 0 | 0 | 0 | 0 | 1 | 1 | 0 | 0 | 1 |
| 33 | </=−3 | 1 | 1 | 0 | 1 | 0 | 0 | 0 | 1 | 0 | 1 | 1 | 0 |
| 34 | −1, −2 | 1 | 1 | 0 | 1 | 0 | 0 | 0 | 1 | 0 | 1 | 1 | 0 |
| 35 | 0 | 1 | 1 | 0 | 1 | 0 | 0 | 0 | 1 | 0 | 1 | 1 | 0 |
| 36 | 1, 2 | 1 | 1 | 0 | 1 | 0 | 0 | 0 | 1 | 0 | 1 | 1 | 0 |
| 37 | >/=3 | 1 | 1 | 0 | 1 | 0 | 0 | 0 | 1 | 0 | 1 | 0 | 1 |

Figure 6:
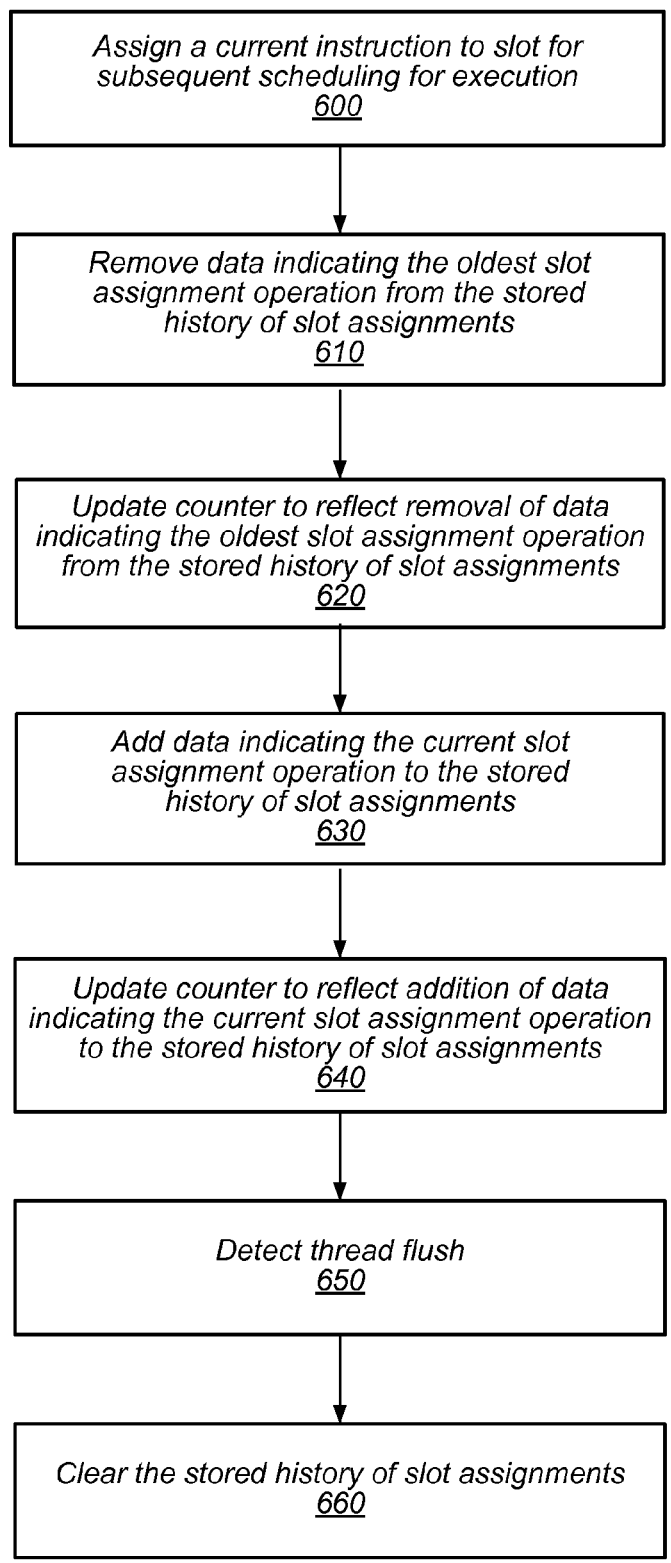
FIG. 6 is a flowchart illustrating a method for updating a history of instruction assignments, according to various embodiments.

As described above, a bias counter may be configured to reflect a history of slot assignments with a signed value. In some embodiments, the counter may be configured to reflect only slot assignments made within a specific historical timeframe, e.g., to reflect a predetermined number of prior slot assignments. In some embodiments, the system described herein may be configured to store data indicating the actual slot assignments made within a desired historical timeframe. In such embodiments, the system may be configured to adjust the bias counter to remove the effect of older slot assignments when those assignments fall outside the desired historical timeframe. FIG. 6 is a flowchart illustrating a method for updating a history of slot assignments, according to some embodiments. In this example, the method may include assigning a current instruction to a slot for subsequent scheduling for execution, as shown in 600. For example, as described above, decode unit 215 may be configured to assign slots for up to two instructions of a decode group in each execution cycle. As illustrated in FIG. 6, the method may include removing data indicating the oldest slot assignment operation (as in 610) from the stored history of slot assignments. For example, a hardware structure such as a FIFO may be configured as a history table storing data indicating a history of slot assignments. In some embodiments, the history table may be configured to store slot assignment data for a predetermined number of previous slot assignments (e.g., the most recent 20 slot assignments). In some embodiments, each entry of the history table may be configured to store, for each slot assignment, any or all of the bits illustrated in the above truth table. For example, in some embodiments, each history table entry may include at least two bits, where each bit indicates the slot assignment for one of the two possible instructions in a decode group. In the example illustrated in FIG. 6, decode unit 215 may remove the data indicating the oldest slot assignment operation from the history table by shifting the corresponding entry out of the history table when a new slot assignment is made.

As illustrated in FIG. 6, the method may include updating the counter to reflect the removal of the data indicating the oldest slot assignment from the stored history of slot assignments, as shown in 620. In some embodiments, this counter adjustment may include removing the effect of the oldest slot assignment, i.e. the entry most recently removed from the history table, on the value of the bias counter. In such embodiments, this counter adjustment may be the inverse of the operation that is performed when the counter is updated to reflect a new slot assignment. For example, decode unit 215 may be configured to decrement the counter to remove the bias due to a previous slot 0 assignment that has been removed from the history table and decode unit 215 may be configured to increment the counter to remove the bias due to a previous slot 1 assignment that has been removed from the history table. As illustrated in FIG. 6, the method may include adding data indicating the current slot assignment to the stored history of slot assignments, as in 630. For example, decode unit 215 may be configured to add a new entry to the history table. As shown in 640, the method may include updating the counter to reflect the addition of the current slot assignment data to the stored history of slot assignments. For example, the counter may be updated in a manner similar to the operation described above that is performed when the counter is updated to reflect a new slot assignment, i.e., decode unit 215 may be configured to increment the counter to remove the bias due to a previous assignment to slot 0 and decode unit 215 may be configured to decrement the counter to remove the bias due to a previous assignment to slot 1. In other embodiments, units within the processor other than decode unit 215 may be configured to update the counter and/or history table based on the slot assignments determined by decode unit 215. While FIG. 6 illustrates an embodiment in which the stored history of slot assignments is updated prior to updating the counter value, in other embodiments, these operations may be performed in a different order. For example, these operations may be implemented in reverse order, such that the counter is updated prior to the stored history of slot assignments. In another embodiment, the stored history of slot assignments and the counter may be updated simultaneously. In some embodiments, a software data structure, rather than a hardware structure, may be used to maintain the stored history of slot assignments.

In some embodiments, a FIFO storing data indicating historical slot assignments may be configured to model the current load of instructions in the pick queue of pick unit 225. For example, the pick queue may include 40 entries, with each entry representing a single instruction. In this case, the pick queue instruction load may be modeled by an 20-element FIFO, in which each element of the FIFO is configured as a history table entry representing the slot assignments made for a decode group of up to two instructions. In this example, the FIFO may be used to model the current load of the pick queue by storing historical slot assignment data for the most recent 20 decode groups. As slot assignment data corresponding to a decode group is shifted out of or into the FIFO, the value of a bias counter may be adjusted accordingly, as described above. In other embodiments, the pick queue may include a different number of entries. For example, the pick queue may include 36 entries and, in this example, the pick queue instruction load may be modeled by an 18-element FIFO.

As described above, in some embodiments, various system events, such as a branch misprediction, an instruction exception, or an external interrupt, may require that all instructions assigned to a single thread be flushed. In some embodiments, if a single thread flush occurs when only a single thread is active, all entries of the slot assignment history may be invalidated. Thus, the system may be configured to clear the slot assignment history. For example, if the stored history of slot assignments is stored in a FIFO, decode unit 215 may be configured to clear all entries of the FIFO in response to a single thread flush. In such embodiments, decode unit 215 may also be configured to reset the value of the bias counter to a neutral state in response to a single thread flush. In some embodiments, if multiple threads are active when a single thread flush occurs, the system may again be configured to clear the slot assignment history, e.g., clearing all entries of the FIFO and resetting the value of the bias counter to a neutral value in response to the thread flush, as discussed above. In other embodiments, in response to a single thread flush when multiple threads are active, the slot assignment history and bias counter may not be cleared. In such embodiments, all entries of the FIFO and the value of the bias counter may be left unchanged. In still other embodiments, during a thread flush when multiple threads are active, the historical slot assignments related to the flushed thread may be determined and invalidated, while the historical slot assignments corresponding to other threads may be left in their current state. In such embodiments, the data structure storing the data indicating historical slot assignments and the bias counter may both be updated accordingly.

While many of the examples above describe embodiments that include two slots, in other embodiments, different numbers of slots are possible. For example, the system may be configured to balance the instruction load between three slots. In some such embodiments, one slot may represent one or more specialized execution units, while the remaining two slots may include execution units of other types. For example, slot 1 may represent the only floating point/graphics execution unit in the system, such that all floating point/graphics instructions are assigned to slot 1. Slots 2 and 3, in this example, may both include integer execution units, such that integer-type instructions may be issued to either slot. In this example, instruction load balancing between slots 2 and 3 may occur in a manner similar to that described above. In another example, a system may be configured to balance instructions between four slots. In such embodiments, the system may include a hierarchy of counters and/or FIFOs used to track slot assignment history and to make slot assignments in a manner similar to that described above. For example, four slots may be equally divided into two groups containing two slots each. The system may be configured to use a counter and/or a FIFO to balance instruction assignments between the two groups in a manner similar to that as described above. The system may then balance the slot assignments within each group containing two slots, using a separate FIFO and/or counter and a method similar to that described above.

Example System Embodiment

Figure 7:
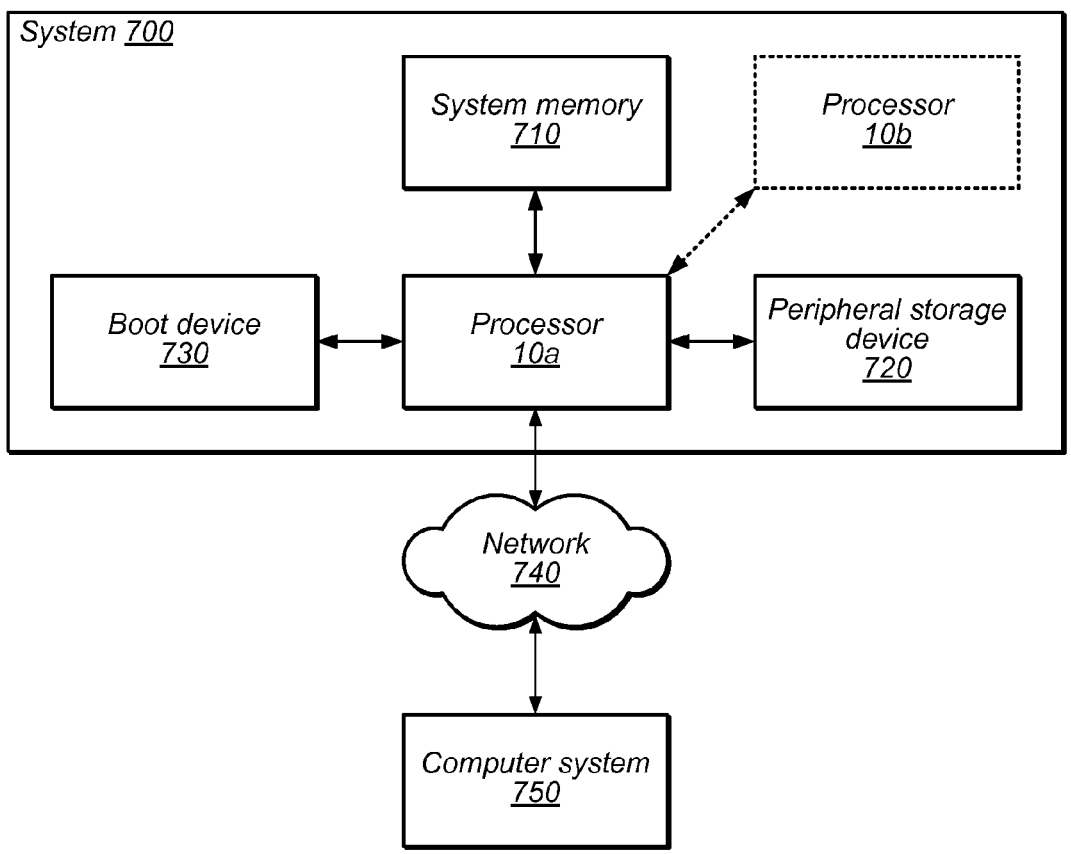
FIG. 7 is a block diagram illustrating one embodiment of a system including a multithreaded processor.

As described above, in some embodiments, processor 10 of FIG. 1 may be configured to interface with a number of external devices. One embodiment of a system including processor 10 is illustrated in FIG. 7. In the illustrated embodiment, system 700 includes an instance of processor 10, shown as processor 10a, that is coupled to a system memory 710, a peripheral storage device 720 and a boot device 730. System 700 is coupled to a network 740, which is in turn coupled to another computer system 750. In some embodiments, system 700 may include more than one instance of the devices shown. In various embodiments, system 700 may be configured as a rack-mountable server system, a standalone system, or in any other suitable form factor. In some embodiments, system 700 may be configured as a client system rather than a server system.

In some embodiments, system 700 may be configured as a multiprocessor system, in which processor 10a may optionally be coupled to one or more other instances of processor 10, shown in FIG. 7 as processor 10b. For example, processors 10a-b may be coupled to communicate via their respective coherent processor interfaces 140.

In various embodiments, system memory 710 may comprise any suitable type of system memory as described above, such as FB-DIMM, DDR/DDR2/DDR3/DDR4 SDRAM, or RDRAM®, for example. System memory 710 may include multiple discrete banks of memory controlled by discrete memory interfaces in embodiments of processor 10 that provide multiple memory interfaces 130. Also, in some embodiments, system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In some embodiments, peripheral storage device 720 may be coupled to processor 10 via peripheral interface(s) 150 of FIG. 1.

As described previously, in some embodiments, boot device 730 may include a device such as an FPGA or ASIC configured to coordinate initialization and boot of processor 10, such as from a power-on reset state. Additionally, in some embodiments, boot device 730 may include a secondary computer system configured to allow access to administrative functions such as debug or test modes of processor 10.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc. In some embodiments, processor 10 may be configured to communicate with network 740 via network interface(s) 160 of FIG. 1.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A method, comprising:
performing, within a processor:
wherein the processor comprises a plurality of slots, wherein each slot comprises a respective plurality of execution units, wherein at least one of the plurality of slots comprises a type of execution unit not present in one or more other slots of the plurality of slots;
decoding an instruction to determine an instruction type associated with the instruction;
based on the determined instruction type, determining that there are at least two slots of the plurality of slots comprising one or more execution units on which the instruction can be executed;
selecting a slot from among the at least two slots, wherein said selecting is dependent on a history of slot assignments between the at least two slots, wherein instructions having a type restricted to execution on only one of the at least two slots are sent to the one of the at least two slots regardless of the history of slot assignments between the at least two slots;
assigning the instruction to one of the one or more execution units of the respective plurality of execution units within the selected slot on which the instruction can be executed; and
updating the history of slot assignments between the at least two slots to reflect said assigning.

2. The method of claim 1, wherein said decoding, determining, selecting, assigning, and updating are performed on a decode group of two or more instructions in a single execution cycle.

3. The method of claim 1,
wherein said selecting is dependent on a value of a counter configured to maintain the history of slot assignments between the at least two slots;
wherein the value of the counter indicates a historical bias in assignments between the at least two slots; and
wherein said updating the history of slot assignments comprises updating the counter.

4. The method of claim 3, wherein said updating the counter comprises:
removing an effect of an oldest slot assignment operation from the counter value; and
adding an effect of said assigning to the counter value.

5. The method of claim 1, wherein said updating the history of slot assignments comprises updating a data structure comprising a plurality of entries representing a predetermined number of previous slot assignment operations, wherein each entry of the data structure comprises data indicating results of a respective slot assignment operation.

6. The method of claim 5, wherein said updating the data structure comprises:
removing an entry representing an oldest slot assignment operation from the data structure; and
storing an entry representing said assigning in the data structure.

7. The method of claim 1, further comprising:
performing, by the processor:
detecting a thread flush; and
in response to detecting the thread flush, clearing the history of slot assignments.

8. The method of claim 1, wherein the plurality of execution units comprise at least one of:
a load/store execution unit configured to execute load/store type instructions;
a floating point execution unit configured to execute floating point type instructions; or
an integer execution unit configured to execute integer type instructions.

9. A processor, comprising:
a plurality of slots, wherein each slot comprises a respective plurality of execution units, wherein at least one of the plurality of slots comprises a type of execution unit not present in one or more other slots of the plurality of slots; and
a decode unit configured to:
decode an instruction to determine an instruction type associated with the instruction;
based on the determined instruction type, determine that there are at least two slots of the plurality of slots comprising one or more execution units on which the instruction can be executed;
select a slot from among the at least two slots, wherein said selecting is dependent on a history of slot assignments between the at least two slots, wherein instructions having a type restricted to execution on only one of the at least two slots are sent to the one of the at least two slots regardless of the history of slot assignments between the at least two slots;
assign the instruction to one of the one or more execution units of the respective plurality of execution units within the selected slot on which the instruction can be executed; and
update the history of slot assignments between the at least two slots to reflect said assigning.

10. The processor of claim 9,
wherein the decode unit is configured to select the slot dependent on a value of a counter configured to maintain the history of slot assignments;
wherein the value of the counter indicates a historical bias in slot assignments between the different collections of execution units; and
wherein to update the history of slot assignments, the decode unit is configured to update the counter.

11. The processor of claim 10, wherein to update the counter, the decode unit is configured to:
remove an effect of an oldest slot assignment operation from the counter value; and
add an effect of said assignment to the counter value.

12. The processor of claim 9, wherein to update the history of slot assignments, the decode unit is configured to:
update a data structure comprising a plurality of entries representing a predetermined number of previous slot assignment operations, wherein each entry of the data structure comprises data indicating results of a respective slot assignment operation; and
wherein to update the data structure, the decode unit is further configured to:
remove an entry representing an oldest slot assignment operation from the data structure; and
store an entry representing said slot assignment in the data structure.

13. The processor of claim 9, wherein the decode unit is further configured to:
detect a thread flush; and
in response to said detection, clear the history of slot assignments.

14. A system, comprising:
a processor; and a memory coupled to the processor and storing instructions executable by the processor;

wherein the processor comprises a plurality of slots, wherein each slot comprises a respective plurality of execution units, wherein at least one of the plurality of slots comprises a type of execution unit not present in one or more other slots of the plurality of slots and a decode unit, wherein the decode unit is configured to:

decode an instruction to determine an instruction type associated with the instruction;

based on the determined instruction type, determine that there are at least two slots of the plurality of slots comprising one or more execution units on which the instruction can be executed;

select a slot from among the at least two slots, wherein said selecting is dependent on a history of slot assignments between the at least two slots, wherein instructions having a type restricted to execution on only one of the at least two slots are sent to the one of the at least two slots regardless of the history of slot assignments between the at least two slots;

assign the instruction to one of the one or more execution units of the respective plurality of execution units within the selected slot on which the instruction can be executed; and update the history of slot assignments between the at least two slots to reflect said assigning.

15. The system of claim 14, wherein to select a slot, the decode unit is configured to select the slot dependent on a value of a counter configured to maintain the history of slot assignments;

wherein the value of the counter indicates a historical bias in slot assignments between the at least to slots;

wherein to update the history of slot assignments, the decode unit is configured to update the counter; and wherein to update the counter, the decode unit is configured to:

remove an effect of an oldest slot assignment operation from the counter value; and add an effect of said assignment to the counter value.

16. The system of claim 14, wherein to update the history of assignments, the decode unit is configured to:

update a data structure comprising a plurality of entries representing a predetermined number of previous slot assignment operations, wherein each entry of the data structure comprises data indicating results of a respective slot assignment operation;

wherein to update the data structure, the decode unit is configured to:

remove an entry representing an oldest slot assignment operation from the data structure; and store an entry representing said slot assignment in the data structure.

17. The system of claim 14, wherein the decode unit is further configured to:

detect a thread flush; and in response to said detection, clear the history of slot assignments.

* * * * *